United States Patent
Mack et al.

(10) Patent No.: US 10,851,278 B2
(45) Date of Patent: Dec. 1, 2020

(54) STABILIZATION AND REDUCTION OF TCT OF BRINES CONTAINING MONOVALENT IODIDES

(71) Applicant: TETRA Technologies, Inc., Conroe, TX (US)

(72) Inventors: Arthur G. Mack, Conroe, TX (US); Drew A. Fowler, Humble, TX (US)

(73) Assignee: Tetra Technologies, Inc., Texas ( * ) Notice: Subject to any disclaimer, the term of this patent is extended or adjusted under 35 U.S.C. 154(b) by 41 days.

(21) Appl. No.: 15/791,872

(22) Filed: Oct. 24, 2017

(65) Prior Publication Data

US 2019/0119548 A1    Apr. 25, 2019

(51) Int. Cl.
| C09K 8/06 | (2006.01) |
| C09K 8/575 | (2006.01) |
| C09K 8/03 | (2006.01) |

(52) U.S. Cl.
CPC .............. *C09K 8/06* (2013.01); *C09K 8/032* (2013.01); *C09K 8/575* (2013.01)

(58) Field of Classification Search
CPC .......... C09K 8/032; C09K 8/06; C09K 8/506; C09K 8/528; C09K 8/86; C09K 8/575; E21B 21/00
See application file for complete search history.

(56) References Cited

U.S. PATENT DOCUMENTS

| | | | |
|---|---|---|---|
| 1,911,195 A | 5/1933 | Kepfer | |
| 2,191,312 A | 2/1940 | Cannon | |
| 2,898,294 A | 8/1959 | Priest et al. | |
| 3,275,552 A | 9/1966 | Kern et al. | |
| 4,292,183 A | 9/1981 | Sanders | |
| 4,444,668 A * | 4/1984 | Walker | C09K 8/22 166/902 |
| 4,465,601 A | 8/1984 | Pasztor, Jr. | |
| 4,486,340 A | 12/1984 | Glass, Jr. | |
| 4,566,976 A | 2/1986 | House et al. | |
| 5,076,364 A | 12/1991 | Hale et al. | |
| 5,330,683 A | 7/1994 | Sufrin | |
| 5,415,230 A | 5/1995 | Fisk, Jr. et al. | |
| 5,728,652 A | 3/1998 | Dobson, Jr. | |
| 5,846,914 A | 12/1998 | Finkelstein et al. | |
| 6,080,704 A | 6/2000 | Halliday et al. | |
| 6,100,222 A | 8/2000 | Vollmer et al. | |
| 6,124,244 A | 9/2000 | Murphey | |
| 6,489,270 B1 | 12/2002 | Vollmer et al. | |
| 6,617,285 B2 | 9/2003 | Crews | |
| 6,635,604 B1 | 10/2003 | Halliday et al. | |
| 6,730,234 B2 | 5/2004 | Symens | |
| 6,843,931 B2 | 1/2005 | Sapienza | |
| 7,048,961 B2 | 5/2006 | Knauf | |
| 7,078,370 B2 | 7/2006 | Crews | |
| 7,306,039 B2 | 12/2007 | Wang et al. | |
| 7,825,073 B2 | 11/2010 | Welton et al. | |
| 7,910,524 B2 | 3/2011 | Welton et al. | |
| 7,960,315 B2 | 6/2011 | Welton et al. | |
| 8,003,578 B2 | 8/2011 | Monroe et al. | |
| 8,030,254 B2 | 10/2011 | Phatak et al. | |
| 8,067,342 B2 | 11/2011 | Lin et al. | |
| 8,071,059 B2 | 12/2011 | Filippi et al. | |
| 8,381,537 B2 | 2/2013 | Morita et al. | |
| 8,697,611 B2 | 4/2014 | Zhang | |
| 8,853,135 B2 | 10/2014 | Phatak et al. | |
| 8,936,111 B2 | 1/2015 | Maghrabi et al. | |
| 8,950,492 B2 | 2/2015 | Maghrabi et al. | |
| 9,593,276 B2 | 3/2017 | Livanec | |
| 9,868,890 B2 | 1/2018 | Alleman | |
| 2003/0092581 A1 | 5/2003 | Crews | |
| 2004/0124013 A1 | 7/2004 | Wiesner et al. | |
| 2005/0038199 A1 | 2/2005 | Wang et al. | |
| 2005/0101491 A1 | 5/2005 | Vollmer | |
| 2005/0253110 A1 | 11/2005 | Chauhan et al. | |
| 2008/0093579 A1 | 4/2008 | Knauf | |
| 2008/0269081 A1 | 10/2008 | Lin et al. | |
| 2009/0048126 A1 | 2/2009 | Phatak et al. | |
| 2010/0016180 A1 * | 1/2010 | Scoggins | C09K 8/035 507/135 |

(Continued)

FOREIGN PATENT DOCUMENTS

| CN | 106928930 A | 7/2017 |
| EP | 0194254 A1 | 9/1986 |

(Continued)

OTHER PUBLICATIONS

The International Search Report and Written Opinion for related PCT application PCT/US2018/057202 dated Jan. 7, 2019.
U.S. Appl. No. 15/468,940 Final Office Action dated Jan. 2, 2019 (10 pages).
The International Search Report and Written Opinion for related PCT application PCT/US2018/057200 dated Dec. 14, 2018.
The International Search Report and Written Opinion for related PCT application PCT/US2018/057205 dated Dec. 14, 2018.
U.S. Appl. No. 15/791,748 Non-Final Office Action dated Feb. 25, 2019 (28 pages).
U.S. Appl. No. 15/468,842 Final Office Action dated Apr. 25, 2019 (12 pages).
Kaminski, et al., "Clearly Different", Reprinted from Oilfield Technology, Jul. 2012, 4 pgs.
Section B14 Solubility in Non-Aqueous Solvents, Formate Technical Manual, Mar. 2013, 1-4, Version 1, Cabot Specialty Fluids, 4 pgs.

(Continued)

*Primary Examiner* — Alicia Bland
(74) *Attorney, Agent, or Firm* — Bracewell LLP; Constance G. Rhebergen

(57) ABSTRACT

A composition for use in a wellbore activity, the composition comprising a stabilized monovalent iodide brine, the stabilized monovalent iodide brine comprises a monovalent salt system, the monovalent salt system comprises a monovalent iodide; a primary iodide stabilizer, the primary iodide stabilizer operable to remove free iodine, prevent the formation of free iodine, and suppress TCT; and an aqueous fluid, where the stabilized monovalent iodide brine has a density greater than 10 lb/gal, where the stabilized monovalent iodide brine has a TCT of less than or equal to 70 deg F.

12 Claims, No Drawings

(56) References Cited

U.S. PATENT DOCUMENTS

| | | |
|---|---|---|
| 2010/0093565 A1 | 4/2010 | Phatak et al. |
| 2010/0130388 A1 | 5/2010 | Phatak et al. |
| 2010/0163255 A1 | 7/2010 | Horton et al. |
| 2010/0303737 A1 | 12/2010 | Hurtig |
| 2010/0311621 A1 | 12/2010 | Kesavan et al. |
| 2012/0118569 A1 | 5/2012 | Deville |
| 2013/0098615 A1 | 4/2013 | Perez et al. |
| 2013/0168095 A1 | 7/2013 | Loveless |
| 2013/0231268 A1 | 9/2013 | Ghosh et al. |
| 2014/0148366 A1 | 5/2014 | Reyes Bautista |
| 2014/0221256 A1 | 8/2014 | Holtsclaw |
| 2014/0262283 A1 | 9/2014 | Savari et al. |
| 2014/0352961 A1* | 12/2014 | Dobson, Jr. ............ C09K 8/685 166/280.1 |
| 2015/0096808 A1 | 4/2015 | Misino et al. |
| 2016/0177698 A1 | 6/2016 | Schultheiss et al. |
| 2016/0208158 A1 | 7/2016 | Monahan et al. |
| 2017/0088762 A1 | 3/2017 | Zhang et al. |
| 2017/0145284 A1 | 5/2017 | Davidson et al. |
| 2017/0158939 A1 | 6/2017 | Chen et al. |
| 2017/0158976 A1 | 6/2017 | O'Rear et al. |
| 2017/0190954 A1 | 7/2017 | Schultheiss et al. |
| 2017/0292055 A1 | 10/2017 | Alleman |
| 2018/0016484 A1* | 1/2018 | Ray ........................ C09K 8/03 |

FOREIGN PATENT DOCUMENTS

| | | |
|---|---|---|
| EP | 2463350 A1 | 6/2012 |
| EP | 1863890 B1 | 10/2014 |
| GB | 2250761 A | 6/1992 |
| GB | 2334279 A | 8/1999 |
| JP | 56098482 A | 8/1981 |
| KR | 20040043935 A | 5/2004 |
| WO | 9821291 A1 | 5/1998 |
| WO | 03064555 A1 | 8/2003 |
| WO | 2004050557 A1 | 6/2004 |
| WO | 2009126548 A2 | 10/2009 |
| WO | 20015068865 A1 | 5/2015 |
| WO | 2016025137 A1 | 2/2016 |
| WO | 2017165754 A1 | 9/2017 |

OTHER PUBLICATIONS

Chen, et al.; Effect of Cryoprotectants on Eutectics of NaCl 2H2O/ice and KCl/ice Studied by Temperature Wave Analysis and Differential Scanning Calorimetry; Thermochimica Acta 431 (2005) 106-112; 7 pgs.

PCT/US2017/023995 International Search Report and Written Opinion dated May 24, 2017; 15 Pgs.

PCT/US2017/023996 International Search Report and Written Opinion dated May 24, 2017; 16 Pgs.

PCT/US2017/024008 International Search Report and Written Opinion dated May 24, 2017; 16 Pgs.

Telang, et al., Effective Inhibition of Mannitol Crystallization in Frozen Solutions by Sodium Chloride, Pharmaceutical Research (Apr. 2003), vol. 20, No. 4, 660-667; 8 pgs.

* cited by examiner

STABILIZATION AND REDUCTION OF TCT OF BRINES CONTAINING MONOVALENT IODIDES

BACKGROUND

Technical Field

Described are compositions for use in wellbore fluids in well operations. More specifically, described are compositions with low crystallization temperatures and high densities for use in wellbore fluids in well operations.

Description of the Related Art

Monovalent halide salts are often used as an inexpensive option for low density fluids in oil and gas exploration. Most halide completion fluids are based on either chlorides, bromides or mixtures of the two. Bromides are preferred over chlorides as they typically allow for higher densities and lower corrosion rates. Currently, to reach a density greater than 12.5 pounds per gallon (lb/gal) the use of formate brines is required and for greater than 13.1 lb/gal, the use of cesium formate is required. Higher density brines are typically required for deep water applications. While formate brines can be incompatible with additives commonly used in halide brines, the most prohibitive factor for the use of cesium formate is the limited supply and consequently high cost associated with these fluids. Therefore, increasing the density of monovalent halide-based brines that are stable and have low crystallization temperatures is desirable.

When used as a completion fluid, brines can crystallize if exposed to lower temperatures and/or higher pressures. As the density of a brine increases above the salt side of the eutectic point so does the true crystallization temperature (TCT) and pressure crystallization temperature (PCT), which can cause blockage to tubulars in a wellbore or in equipment on the surface if the fluid crystallizes. If crystallization occurs and the solid is filtered from the brine, this will lead to a decrease in fluid density and can cause wellbore stability issues or a blowout. Applying pressure to a monovalent brine at a density above the eutectic point will lead to an increase in density, which in turn can lead to crystallization. Lowering the TCT of a fluid at a given density is therefore desirable.

Crystallization inhibitors can be used to lower the TCT and PCT, but can also result in a reduction of the density of the brine. Zinc salts, such as zinc bromide ($ZnBr_2$), can be used to increase the density greater than 14.2 lb/gal while maintaining a low true crystallization temperature. However, zinc is a marine pollutant and can cause issues in the processing stage if residual zinc is in the oil sent to the refinery.

In conventional brine systems, crystallization inhibitors, such as methanol and ethylene glycol, can lower TCT, but also dramatically lower the density of the brine (making it unsuitable for the original purpose), which requires more solid salt be added to bring the density of the brine back to the operational density. In most cases, enough salt cannot be added to achieve the operational density and the required crystallization temperature without adding weighting additives, such as zinc bromide.

SUMMARY

Described are compositions for use in wellbore fluids in well operations. More specifically, described are compositions with low crystallization temperatures and high densities for use in wellbore fluids in well operations.

In a first aspect, a composition for use in a wellbore activity is provided. The composition includes a stabilized monovalent iodide brine that includes a monovalent salt system that includes a monovalent iodide, a primary iodide stabilizer, the primary iodide stabilizer operable to remove free iodine, prevent the formation of free iodine, and suppress TCT, and an aqueous fluid, where the stabilized monovalent iodide brine has a density greater than 10 lb/gal and a TCT of less than or equal to 70 deg F.

In certain aspects, the monovalent iodide is selected from the group consisting of lithium iodide, sodium iodide, potassium iodide, cesium iodide, rubidium iodide and combinations of the same. In certain aspects, the primary iodide stabilizer is a low molecular weight polyol. In certain aspects, the low molecular weight polyol is selected from the group consisting of sorbitol, glycerol, xylitol, mannitol, diglycerol, polyethylene glycol with a molecular weight less than 1000 Da, and combinations of the same. In certain aspects, the monovalent iodide is present in the range between 1 wt % and 70 wt %, and further wherein the primary iodide stabilizer is present in the range between 0.1 wt % and 35 wt % of the stabilized monovalent iodide brine. In certain aspects, the monovalent salt system further includes an additional halide. In certain aspects, the additional halide is selected from the group consisting of a divalent halide, a monovalent halide, and combinations of the same. In certain aspects, the additional halide includes a monovalent halide selected from the group consisting of lithium bromide, lithium chloride, sodium bromide, sodium chloride, potassium bromide, potassium chloride, cesium bromide, cesium chloride, rubidium bromide, rubidium chloride, and combinations of the same. In certain aspects, the additional halide includes a divalent halide selected from the group consisting of calcium bromide, calcium chloride, calcium iodide, magnesium bromide, magnesium chloride, magnesium iodide, strontium bromide, strontium chloride, strontium iodide, and combinations of the same. In certain aspects, the monovalent iodide is present in the range between 1 wt % and 70 wt % of the stabilized monovalent iodide brine, and further wherein the additional halide is present in the range between 1 wt % and 45 wt %, and further wherein the primary iodide stabilizer is present in the range between 0.1 wt % and 35 wt % of the stabilized monovalent iodide brine. In certain aspects, the stabilized monovalent iodide brine further includes a secondary iodide stabilizer. In certain aspects, the secondary iodide stabilizer is selected from the group consisting of amines, amino alcohols, hydroxylamines, hydrazines, erythorbic acid and derivative erythorbate salts, ascorbic acid and derivative ascorbate salts, citric acid and derivative citrate salts, and combinations of the same. In certain aspects, the secondary iodide stabilizer is present in an amount between 0.001% v/v and 5% v/v.

In a second aspect, a method of using a stabilized monovalent iodide brine during a wellbore activity is provided. The method includes the steps of introducing the stabilized monovalent iodide brine into a wellbore, the stabilized monovalent iodide brine includes a monovalent salt system that includes monovalent iodide, a primary iodide stabilizer operable to remove free iodine, prevent the formation of free iodine, and suppress TCT, and aqueous fluid and completing the wellbore activity.

In certain aspects, the wellbore activity is selected from the group consisting of drilling, reservoir drilling, completion activities, workover activities, well intervention activities, or as a packer fluid.

In a third aspect, a method of creating a stabilized monovalent iodide brine is provided. The method includes the steps of adding an amount of a monovalent salt system to an aqueous fluid, where the monovalent salt system includes a monovalent iodide, and adding an amount of the primary iodide stabilizer to the aqueous fluid.

In certain aspects, the method further includes the step of adding an amount of a secondary iodide stabilizer to the stabilized monovalent iodide brine.

DETAILED DESCRIPTION

While the scope will be described with several embodiments, it is understood that one of ordinary skill in the relevant art will appreciate that many examples, variations and alterations to the apparatus and methods described herein are within the scope and spirit. Accordingly, the exemplary embodiments described herein are set forth without any loss of generality, and without imposing limitations.

The compositions and methods described here are directed to monovalent iodide-containing brines that are stabilized. The compositions and methods described here are directed to stabilized monovalent iodide brines for use in wellbore activities. In at least one embodiment, the stabilized monovalent iodide brines are clear brines.

Monovalent iodides can achieve greater density and greater solubility as compared to other monovalent halides, as shown in Table 1.

TABLE 1

Solubility of Monovalent Halides

| Monovalent Halide Salt | Solubility in grams per 100 milliliters at 0 degrees Celsius (deg C.)[1] | Density of Anhydrous Monovalent Halide Salt, grams per cubic centimeter $(g/cm^3)$[1] |
|---|---|---|
| Lithium Chloride (LiCl) | 69.2 | 2.07 |
| Lithium Bromide (LiBr) | 143 | 3.46 |
| Lithium Iodide (LiI) | 151 | 4.08 |
| Sodium Chloride (NaCl) | 35.6 | 2.16 |
| Sodium Bromide (NaBr) | 80.2 | 3.21 |
| Sodium Iodide (NaI) | 159 | 3.67 |
| Potassium Chloride (KCl) | 28 | 1.98 |
| Potassium Bromide (KBr) | 53.6 | 2.74 |
| Potassium Iodide (KI) | 128 | 3.12 |

[1]https://en.wikipedia.org/wiki/Solubility_table

However, monovalent iodide brines can be unstable and tend to form free iodine when exposed to oxygen or carbon dioxide. Brines can acquire carbon dioxide and oxygen from the air when being pumped and circulated. The oxygen or carbon dioxide can oxidize the iodide ion ($I^-$) to iodine ($I_2$). The presence of iodine results in a brine that is orange in color and can eventually lead to the formation of iodine crystals. The reaction of the iodide ion to iodine can produce unwanted byproducts that would have a negative impact on the properties of the brine and the well operations. Monovalent iodide brines in the absence of a primary iodide stabilizer can result in the degradation of the brine. The degraded brines can include halogens that can react with the wellbore and can be corrosive. Due to this instability, monovalent iodides have not been used in commercial wellbore applications. Advantageously, the addition of a primary iodide stabilizer described here demonstrates the ability to stabilize the monovalent iodides in the brine by removing free iodine and protecting against further oxidation.

Advantageously, the stabilized monovalent iodide brine compositions have densities greater than 10 lb/gal, increased gas hydrate suppression, stability at elevated temperatures, and TCT of less than or equal to 70 degrees Fahrenheit (deg F.). Advantageously, the stabilized monovalent iodide brine compositions can have densities equal to or greater than divalent brines or formate brines making the stabilized monovalent iodide brines substitutes for divalent brines and formate brines. Substituting the stabilized monovalent iodide brines for divalent brines is advantageous because monovalent brines tend to have fewer compatibility issues with other wellbore fluids, can cause less corrosion, and can cause less damage to the formation surrounding the hydrocarbon producing section of the wellbore. Advantageously, the stabilized divalent iodide brines can be formulated to have the target properties desired for the wellbore activity, such that the formulations can vary based on the density and TCT desired for a given wellbore activity or a set of wellbore and operating conditions.

As used here, "monovalent iodide" refers to a compound containing an alkali metal ion and iodide ion. Examples of monovalent iodides can include lithium iodide, sodium iodide, potassium iodide, cesium iodide, rubidium iodide, and combinations of the same.

As used here, "additional halide' refers to a monovalent halide, a divalent halide, and combinations of the same.

As used here, "monovalent halide" refers to a salt compound containing an alkali metal ion and a halide ion other than iodide. Examples of monovalent halides can include lithium bromide, lithium chloride, sodium bromide, sodium chloride, potassium bromide, potassium chloride, cesium bromide, cesium chloride, rubidium bromide, rubidium chloride, and combinations of the same.

As used here, "divalent halide" refers to a salt compound containing an alkaline earth metal ion and a halide ion. Examples of divalent halides can include calcium bromide, calcium chloride, calcium iodide, magnesium bromide, magnesium chloride, magnesium iodide, strontium bromide, strontium chloride, strontium iodide, and combinations of the same.

As used here, "primary iodide stabilizer" refers to a compound that can remove free iodine, prevent the formation of free iodine, while also lower TCT.

As used herein, "true crystallization temperature" or "TCT" refers to the temperature at which crystals form in a brine for a given brine density. The true crystallization temperature is defined as the temperature corresponding to the maximum temperature reached following the super-cooling minimum. In a plot of temperature during a cooling cycle, TCT is the maximum temperature reached following the super-cooling minimum or the inflection point in cases with no super-cooling. If there is no super-cooling TCT will equal first crystal to appear (FCTA). TCT is the measured crystallization temperature nearest the temperature at which a brine will naturally crystallize in pumps, lines, filtration units, and tanks. Further described in API Recommended Practice 13J, *Testing of Heavy Brines,* 5th Ed. October 2014. By way of example, in a monovalent brine containing only a monovalent salt and water, as the brine density changes, the TCT changes.

As used herein, "clear brine" refers to a solids-free liquid brine where the salts dissolve completely and solids, such as weighting materials, lost circulations materials, and viscosifying agents, are not added. Advantageously, clear brines have sufficient densities to maintain well control while minimizing potential damage to the producing zone of the well that might arise from undissolved solids.

As used herein, "low molecular weight polyols" means polyols with a molecular weight of less than 1000 daltons (Da).

As used here, "secondary iodide stabilizer" refers to a compound that can scavenge free oxygen or carbon dioxide present in a brine to prevent further oxidation of the iodide to iodine and can react with the iodine to produce iodide and stabilize the brine. Advantageously, the secondary iodide stabilizer can also stabilize the primary iodide stabilizer.

As used here, "aqueous fluid" refers to a water-containing fluid that can be used in wellbore activities. Examples of the aqueous fluid can include water, brine, water-based drilling fluids, and combinations of the same.

The stabilized monovalent iodide brine can contain a monovalent salt system, a primary iodide stabilizer, and an aqueous fluid. In at least one embodiment, the stabilized monovalent iodide brine can include a monovalent salt system, a primary iodide stabilizer, an aqueous fluid, and a secondary iodide stabilizer.

The monovalent salt system can include a monovalent iodide alone or a monovalent iodide in combination with an additional halide. In at least one embodiment, where the monovalent salt system contains only a monovalent iodide, the stabilized monovalent iodide brine can include the monovalent iodide, a primary iodide stabilizer, and an aqueous fluid. In at least one embodiment, where the monovalent salt system contains a combination of a monovalent iodide and an additional halide, the stabilized monovalent iodide brine can include the monovalent iodide, the additional halide, a primary iodide stabilizer, and an aqueous fluid. In at least one embodiment, the stabilized monovalent iodide brine can include a monovalent iodide, an additional halide, a primary iodide stabilizer, an aqueous fluid, and a secondary iodide stabilizer.

Examples of the primary iodide stabilizer can include low molecular weight polyols. Examples of low molecular weight polyols include sorbitol, glycerol, xylitol, mannitol, diglycerol, polyethylene glycol with a molecular weight less than 1000 Da, and combinations of the same.

Examples of the secondary iodide stabilizer can include amines, amino alcohols, hydroxylamines, hydrazines, erythorbic acid and derivative erythorbate salts, ascorbic acid and derivative ascorbate salts, citric acid and derivative citrate salts, and combinations of the same. Examples of amines include ethylenediamine (EDA), diethylenetriamine (DETA), triethylenetetramine (TETA), tetraethylenepentamine (TEPA), pentaethylenehexamine (PEHA), aminoethylpiperazine (AEP), hexaethyleneheptamine (HEHA), piperazine, methoxypropylamine (MOPA), morpholine, n-aminopropylmorpholine (APM), and combinations of the same. Examples of amino alcohols include monoethanolamine (MEA), diethanolamine (DEA), triethanolamine (TEA), diethylaminoethanol (DEAE), dimethylethanolamine (DMEA), N-[3-aminopropyl]diethanolamine, aminoethylethanolamine (AEEA), 4-[2-hydroxyethyl]morpholine, diglycolamine, and combinations of the same. Examples of hydroxylamines include diethylhydroxylamine (DEHA), dimethylhydroxylamine (DMHA), hydroxylamine, and combinations of the same. Examples of derivative erythorbate salts include sodium erthyorbate. Examples of derivative ascorbate salts include sodium ascorbate, potassium ascorbate, magnesium ascorbate, calcium ascorbate and combinations of the same. Examples of derivative citrate salts include mono-, di-, and tri-sodium citrate, potassium citrate, magnesium citrate, calcium citrate, and combinations of the same. In at least one embodiment, the secondary iodide stabilizer can be the amine MEA. In at least one embodiment, the secondary iodide stabilizer can be an amine, which can include a combination of TEPA, PEHA and HEHA, sold under the name ethyleneamine E-100 from Huntsman Corporation (The Woodlands, Tex.).

In an embodiment of the stabilized monovalent iodide brine, where the monovalent salt system contains only a monovalent iodide, the monovalent iodide can be present in the range between 1 percent by weight (wt %) and 70 wt % of the stabilized monovalent iodide brine and alternately between 5 wt % and 65 wt % of the stabilized monovalent iodide brine. In an embodiment of the stabilized monovalent iodide brine, where the monovalent salt system contains only a monovalent iodide, the primary iodide stabilizer can be present in the range between 0.1 wt % and 35 wt % of the stabilized monovalent iodide brine, alternately between 1 wt % and 30 wt % of the stabilized monovalent iodide brine, and alternately between 2 wt % and 25 wt % of the stabilized monovalent iodide brine. In an embodiment of the stabilized monovalent iodide brine, where the monovalent salt system contains only monovalent iodide, the secondary iodide stabilizer can be present in an amount between 0.001 volume/volume percent (% v/v) and 5% v/v.

In an embodiment of the stabilized monovalent iodide brine, where the monovalent salt system contains the combination of a monovalent iodide and an additional halide, the monovalent iodide can be present in the range between 1 wt % and 70 wt % of the stabilized monovalent iodide brine. In an embodiment of the stabilized monovalent iodide brine, where the monovalent salt system contains the combination of a monovalent iodide and an additional halide, the additional halide can be present in the range between 1 wt % and 45 wt % of the stabilized monovalent iodide brine. In an embodiment of the stabilized monovalent iodide brine, where the monovalent salt system contains the combination of a monovalent iodide and an additional halide, the primary iodide stabilizer can be present in the range between 0.1 wt % and 35 wt % of the stabilized monovalent iodide brine. In an embodiment of the stabilized monovalent iodide brine, where the monovalent salt system contains the combination of a monovalent iodide and an additional halide, the amine can be present in an amount between 0.001% v/v and 5% v/v.

The stabilized monovalent iodide brine is an aqueous mixture, such that the remainder of the stabilized divalent iodide brine includes the aqueous fluid. In at least one embodiment, the aqueous fluid is water. In at least one embodiment, the aqueous fluid is brine.

The stabilized monovalent iodide brine can have a density between 10 lb/gal and 17 lb/gal, alternately between 12.5 lb/gal and 16 lb/gal, and alternately between 13 lb/gal and 15 lb/gal.

The stabilized monovalent iodide brine can have a TCT less than or equal to 70 deg F., alternately less than or equal to 60 deg F., alternately less than or equal to 50 deg F., alternately less than or equal to 40 deg F., alternately less than or equal to 30 deg F., alternately less than or equal to 20 deg F., alternately less than or equal to 10 deg F., and alternately less than or equal to 0 deg F.

The stabilized monovalent iodide brine can be prepared by mixing the monovalent salt system and the aqueous fluid in amounts to achieve the desired density. In a second step, the primary iodide stabilizer can be mixed. In at least one embodiment, additional additives, such as the secondary iodide stabilizer are added in a third step. Following each step, testing of properties can be performed and additional components can be added as needed. The stabilized monovalent iodide brine can be prepared at the wellsite or can be prepared offsite from the wellsite and delivered premade to the wellsite. In at least one embodiment, when the stabilized monovalent iodide brine is prepared at the wellsite, additional amounts of the components can be added after the initial preparation of the stabilized monovalent iodide brine. In at least one embodiment, when the stabilized monovalent iodide brine is prepared offsite from the wellsite additional amounts of the components can be added after being delivered to the wellsite to adjust the properties if necessary.

The stabilized monovalent iodide brines described here can be used in any wellbore activity during the drilling and completion phases of an oil and gas producing well that requires a brine-based fluid. Wellbore activities can include drilling, reservoir drilling, completion activities, workover activities, well intervention activities, or as a packer fluid.

The stabilized monovalent iodide brine is in the absence of cesium formate, such that the stabilized monovalent iodide brine does not contain cesium formate. The stabilized monovalent iodide brine is in the absence of formate brines, such that the stabilized monovalent brine does not contain formate salts. The stabilized monovalent iodide brine is in the absence of earth nitrate salts, such that the stabilized monovalent iodide brine does not contain earth nitrate salts.

EXAMPLES

For each of the examples, samples were developed based on a matrix approach targeting density and TCT. In the matrix approach, a test matrix was developed based on varying the amount of the monovalent iodide salt used and the properties were measured. A larger matrix was then conducted and the samples were formulated from this larger matrix to meet predetermined specifications. Samples were prepared by mixing the salts with water in a first step. In a second step, additional additives were added such as the primary iodide stabilizer and secondary iodide stabilizer. The samples were mixed until complete dissolution of the components.

Example 1

Example 1 analyzed the properties of single-salt monovalent iodide brines. Density and TCT were measured after the samples were prepared. Density was measured at 60 deg F.

TABLE 2

Properties of monovalent iodide brines

| | Wt % NaI | Wt % Water | Wt % Glycerol | Wt % Sorbitol | Density (lb/gal) | TCT (° F.) |
|---|---|---|---|---|---|---|
| Sample 1 | 58.3 | 41.7 | 0 | 0 | 15.49 | 3.7 |
| Sample 2 | 61.4 | 38.6 | 0 | 0 | 15.28 | 5 |
| Sample 3 | 55.5 | 27.8 | 0 | 16.7 | 15.13 | −23 |
| Sample 4 | 64.3 | 35.7 | 0 | 0 | 15.93 | 54 |
| Sample 5 | 66.6 | 30.4 | 3 | 0 | 16.38 | 85 |
| Sample 6 | 66.6 | 26.5 | 0 | 6.6 | 16.54 | 89 |

The data in Table 2 demonstrate that monovalent iodide brines can achieve densities greater than 15 lb/gal while maintaining TCT values that allow the monovalent iodide brines to be used in oil and gas exploration fluids. Samples 1, 2, and 4 were not stable over time in the absence of sorbitol or glycerol and displayed oxidation of the iodide observed through discoloration of the fluid.

Example 2

Example 2 assessed the properties of monovalent brines. In Table 3, samples 1 and 2 were comparison samples containing only sodium bromide. Density and TCT were measured after the samples were prepared. Density was measured at 60 deg F.

TABLE 3

Properties of monovalent brines

| | Wt % NaBr | Wt % NaI | Wt % Water | Wt % Sorbitol | Density (lb/gal) | TCT (° F.) |
|---|---|---|---|---|---|---|
| Sample 1 | 37.7 | 0 | 32.2 | 30 | 13.0 | 21 |
| Sample 2 | 42.1 | 0 | 37.9 | 20 | 13.0 | 50 |
| Sample 3 | 30 | 10 | 30 | 30 | 13.41 | 24 |
| Sample 4 | 30 | 15 | 35 | 20 | 13.55 | 37 |
| Sample 5 | 25 | 20 | 35 | 20 | 13.64 | 27 |
| Sample 6 | 20 | 25 | 35 | 20 | 13.62 | −7 |
| Sample 7 | 27.5 | 22.5 | 35 | 15 | 14.02 | 62 |
| Sample 8 | 22.5 | 27.5 | 35 | 15 | 14.08 | 51 |
| Sample 9 | 22.7 | 27.3 | 40 | 10 | 13.77 | 26 |
| Sample 10 | 20 | 35 | 35 | 10 | 14.70 | 64 |
| Sample 11 | 15 | 40 | 35 | 10 | 14.76 | 40 |
| Sample 12 | 13.6 | 42.4 | 34.0 | 10 | 15.00 | 42 |
| Sample 13 | 11.4 | 42.4 | 31.3 | 15 | 14.97 | 31 |
| Sample 14 | 9.1 | 42.5 | 28.4 | 20 | 14.99 | 6 |

The data for Sample 14 illustrates that monovalent iodide brines can be formulated that have densities around 15 lb/gal with a TCT less than 30 deg F. The samples demonstrate how the components can impact the properties of density and TCT and that specific formulations must be based on the desired properties for the specific wellbore activity to be performed. The composition in Sample 14 results in the highest density while maintaining a low TCT.

Example 3

Example 3 tested the stability of monovalent iodide brines at elevated temperatures. In Table 4, sample 1 was a stabilized monovalent iodide brine containing 35 wt % water, 25 wt % NaBr as the additional halide, 20 wt % NaI as the monovalent iodide, and 20 wt % sorbitol as the primary iodide stabilizer with a density of 13.64 lb/gal and 27 deg F. TCT. Sample 2 was prepared by adding 0.03% v/v MEA as a secondary iodide stabilizer to the stabilized monovalent iodide brine of Sample 1. The prepared samples were introduced to a high temperature aging cell and pressurized to 300 psi nitrogen and placed in an oven set to 300 deg F. for 7 days. Testing of the pH and TCT was performed after the samples were prepared and after the aging test.

TABLE 4

Thermal Stability of Samples 1 and 2 at 300 deg F. for 7 days.

| | Sample 1 | Sample 2 |
|---|---|---|
| Primary iodide stabilizer | 20% Sorbitol | 20% sorbitol |
| Secondary iodide stabilizer | — | 0.30% v/v MEA |
| pH before heat aging | 7.01 | 10.68 |
| pH after 1 week @ 300 deg F. | 3.51 | 9.90 |
| TCT before aging | 27 deg F. | 27 deg F. |
| TCT after aging | 27 deg F. | 27 deg F. |
| Fluid Color before Aging | Pale yellow | Colorless |
| Fluid Color after Aging | Dark brown | Pale yellow |

TABLE 5

Corrosion data of monovalent iodide brine

| | Sample 1 | Sample 2 |
|---|---|---|
| Primary iodide stabilizer | 20% sorbitol | 20% sorbitol |
| Secondary iodide stabilizer | — | 0.30% v/v MEA |
| pH before aging | 7.01 | 10.68 |
| pH after 1 week @ 300 deg F. | 4.95 | 10.54 |
| Corrosion rate (mil/yr) | 2.95 | 0.02 |

Table 4 illustrates that the addition of the MEA results in a brine that is more stable after prolonged exposure to high temperatures. The change in pH in Sample 1 suggests the primary iodide stabilizer was undergoing degradation due to the elevated temperature, which is prevented in Sample 2 because of the presence of MEA. The degradation is further evidenced by the change in color. The TCT is not impacted. The data in Table 5 demonstrates that the corrosion rate for Sample 1 is appreciably greater in the absence of MEA providing further support that the addition of MEA stabilizes the pH.

Example 4

The data in Table 6 provide formulation, density, and TCT data from various brines formulated using monovalent iodide salts. This data shows that various monovalent iodide salts can be used to formulate brines with higher densities than currently available options while maintaining a TCT that allows the brine to be used in deep water or other applications that would require a low TCT.

TABLE 6

Properties of monovalent iodide brines

| | Wt % KI | Wt % Water | Wt % Glycerol | Wt % Sorbitol | Density (lb/gal) | TCT (° F.) |
|---|---|---|---|---|---|---|
| Sample 1 | 56.2 | 43.8 | 0 | 0 | 13.83 | 21 |
| Sample 2 | 56.1 | 36.0 | 0 | 7.9 | 14.05 | 36 |
| Sample 3 | 56.6 | 39.1 | 4.3 | 0 | 14.5 | 48 |
| Sample 4 | 59.2 | 40.8 | 0 | 0 | 14.24 | 50 |

The data in Table 6 demonstrate that stabilized monovalent iodide brines can achieve densities of at least 14 lb/gal and TCT less than 50 deg F. Samples 1 and 4 were unstable over time due to the absence of primary iodide stabilizer.

TABLE 7

Properties of monovalent iodide brines

| | Wt % NaBr | Wt % KI | Wt % Water | Density (lb/gal) | TCT (° F.) |
|---|---|---|---|---|---|
| Sample 1 | 40.0 | 10.0 | 50.0 | 12.94 | 7.6 |
| Sample 2 | 15.6 | 32.0 | 48.4 | 13.17 | 22 |
| Sample 3 | 10.0 | 40.1 | 49.9 | 12.98 | −17 |
| Sample 4 | 29.8 | 20.5 | 49.7 | 13.07 | 35.6 |
| Sample 5 | 25.0 | 25.3 | 49.7 | 13.05 | 34 |
| Sample 6 | 5.21 | 44.95 | 49.84 | 12.97 | −13 |
| Sample 7 | 19.48 | 39.1 | 41.36 | 14.32 | 92 |

As shown in Table 7, multi-salt monovalent iodide brines can be formulated that have densities up to 13.2 lb/gal with a TCT less than 30 deg F. The data in Table 7 demonstrate that the formulations of monovalent iodide brines can be tailored to meet the needs of the wellbore activity.

TABLE 8

Properties of monovalent iodide brines

| | Wt % LiI | Wt % Water | Density (lb/gal) | TCT (° F.) |
|---|---|---|---|---|
| Sample 1 | 47.9 | 52.1 | 12.76 | <−50 |
| Sample 2 | 52.1 | 47.9 | 14.53 | 2.5 |
| Sample 3 | 60.0 | 40.0 | 14.88 | 38.5 |

As shown in Table 8, monovalent iodide brines that include lithium iodide can be formulated that have densities up to 14.88 lb/gal with a TCT of 39 deg F. or lower.

Although the present embodiments have been described in detail, it should be understood that various changes, substitutions, and alterations can be made hereupon without departing from the principle and scope. Accordingly, the scope should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations of the same are each intended to have an open, non-limiting meaning that does not exclude additional elements or steps.

It is to be understood that that the mere use of the term "primary" and "secondary" does not require that there be any "tertiary" or "third" component, although that possibility is contemplated under the scope of the embodiments.

What is claimed is:

1. A composition of a clear brine for use in a wellbore activity, the composition of a clear brine comprising:
    a stabilized monovalent iodide brine, the stabilized monovalent iodide brine comprises:
        a monovalent salt system, the monovalent salt system comprises a monovalent iodide;
        a primary iodide stabilizer, an amount of primary iodide stabilizer operable to remove free iodine, prevent the formation of free iodine, and suppress TCT, wherein the primary iodide stabilizer comprises a low molecular weight polyol, wherein the amount of the primary iodide stabilizer is present in the range between 1 wt % and 30 wt % of the stabilized monovalent iodide brine;
        a secondary iodide stabilizer, wherein the secondary iodide stabilizer is present in an amount in the range between 0.001% v/v and 5% v/v, wherein the amount of the secondary iodide stabilizer is operable to stabilize the primary iodide stabilizer, wherein the secondary iodide stabilizer is selected from the group consisting of amines, amino alcohols, hydroxylamines, hydrazines, erythorbic acid and erythorbate salts, ascorbic acid and ascorbate salts, citric acid and citrate salts, and combinations of the same,
        wherein the amines are selected from the group consisting of ethylenediamine (EDA), diethylenetriamine (DETA), triethylenetetramine (TETA), tetraethylenepentamine (TEPA), pentaethylenehexamine (PEHA), aminoethylpiperazine (AEP), hexaethyleneheptamine (HEHA), piperazine, diethylhydroxylamine (DEHA), methoxypropylamine (MOPA), morpholine, n-aminopropylmorpholine (APM) and combinations thereof, wherein the amino alcohols are selected from the group consisting of monoethanolamine (MEA), diethanolamine (DEA), triethanolamine (TEA), diethylaminoethanol (DEAE), dimethylethanolamine (DMEA), aminoethylethanolamine (AEEA), 4-[2-hydroxyethyl] morpholine, diglycolamine, and combinations of the same; and an aqueous fluid, the aqueous fluid present in the range between 20 wt % and 55 wt % of the stabilized monovalent iodide brine;

where the stabilized monovalent iodide brine has a density between 12.5 lb/gal and 16 lb/gal.

2. The composition of claim 1, wherein the monovalent iodide is selected from the group consisting of lithium iodide, sodium iodide, potassium iodide, cesium iodide, rubidium iodide, and combinations of the same.

3. The composition of claim 1, wherein the low molecular weight polyol is selected from the group consisting of sorbitol, glycerol, xylitol, mannitol, diglycerol, polyethylene glycol with a molecular weight less than 1000 Da, and combinations of the same.

4. The composition of claim 1, wherein the monovalent iodide is present in the range between 1 wt % and 70 wt %.

5. The composition of claim 1, wherein the monovalent salt system further comprises an additional halide.

6. The composition of claim 5, wherein the additional halide is selected from the group consisting of a divalent halide, a monovalent halide, and combinations of the same.

7. The composition of claim 5, wherein the additional halide comprises a monovalent halide selected from the group consisting of lithium bromide, lithium chloride, sodium bromide, sodium chloride, potassium bromide, potassium chloride, cesium bromide, cesium chloride, rubidium bromide, rubidium chloride, and combinations of the same.

8. The composition of claim 5, wherein the additional halide comprises a divalent halide selected from the group consisting of calcium bromide, calcium chloride, calcium iodide, magnesium bromide, magnesium chloride, magnesium iodide, strontium bromide, strontium chloride, strontium iodide, and combinations of the same.

9. The composition of claim 5, wherein the monovalent iodide is present in the range between 1 wt % and 70 wt % of the stabilized monovalent iodide brine, and further wherein the additional halide is present in the range between 1 wt % and 45 wt %.

10. A method of creating a stabilized monovalent iodide clear brine, the method comprising the steps of:

adding an amount of a monovalent salt system to aqueous fluid, where the monovalent salt system comprises a monovalent iodide; and adding an amount between 1 wt % and 30 wt % of a primary iodide stabilizer, wherein the primary iodide stabilizer comprises a low molecular weight polyol;

adding an amount between 0.001% v/v and 5% v/v of a secondary iodide stabilizer, wherein the secondary iodide stabilizer is selected from the group consisting of amines, amino alcohols, hydroxylamines, hydrazines, erythorbic acid and erythorbate salts, ascorbic acid and ascorbate salts, citric acid and citrate salts, and combinations of the same, wherein the amines are selected from the group consisting of ethylenediamine (EDA), diethylenetriamine (DETA), triethylenetetramine (TETA), tetraethylenepentamine (TEPA), pentaethylenehexamine (PEHA), aminoethylpiperazine (AEP), hex aethyleneheptamine (HEHA), piperazine, diethylhydroxylamine (DEHA), methoxypropylamine (MOPA), morpholine, n-aminopropylmorpholine (APM) and combinations thereof, wherein the amino alcohols are selected from the group consisting of monoethanolamine (MEA), diethanolamine (DEA), triethanolamine (TEA), diethylaminoethanol (DEAE), dimethylethanolamine (DMEA), aminoethylethanolamine (AEEA), 4-[2-hydroxyethyl]morpholine, diglycolamine, and combinations of the same.

11. The method of claim 10, wherein the monovalent iodide is selected from the group consisting of lithium iodide, sodium iodide, potassium iodide, cesium iodide, rubidium iodide, and combinations of the same.

12. The method of claim 10, wherein the monovalent salt system further comprises an additional halide.

\* \* \* \* \*